US008033954B2

(12) United States Patent
Theobald et al.

(10) Patent No.: US 8,033,954 B2
(45) Date of Patent: Oct. 11, 2011

(54) HYBRID POWERTRAIN WITH REVERSING ENGINE AND METHOD OF CONTROL

(75) Inventors: Mark A. Theobald, Bloomfield Hills, MI (US); Rodney B. Rask, Grosse Pointe Woods, MI (US); Madhusudan Raghavan, West Bloomfield, MI (US); Paul M. Najt, Bloomfield Hills, MI (US); Alan G. Holmes, Clarkston, MI (US); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1156 days.

(21) Appl. No.: 11/736,704

(22) Filed: Apr. 18, 2007

(65) Prior Publication Data
US 2008/0257310 A1 Oct. 23, 2008

(51) Int. Cl.
*B60K 1/02* (2006.01)
(52) U.S. Cl. .......................................................... 477/3
(58) Field of Classification Search ........................ None
See application file for complete search history.

(56) References Cited

U.S. PATENT DOCUMENTS

| | | | | |
|---|---|---|---|---|
| 2,346,737 A * | 4/1944 | Essl | ............................ | 123/41 R |
| 3,722,484 A * | 3/1973 | Gordini | ...................... | 123/90.27 |
| 3,958,900 A * | 5/1976 | Ueno | ............................ | 417/237 |
| 5,881,690 A * | 3/1999 | Park | .......................... | 123/90.18 |
| 5,931,757 A | 8/1999 | Schmidt | | |
| 6,135,078 A * | 10/2000 | Doi et al. | ................... | 123/90.18 |
| 6,237,546 B1 * | 5/2001 | Gander | ....................... | 123/41 E |
| 6,318,313 B1 * | 11/2001 | Moriya et al. | ............. | 123/90.15 |
| 6,852,063 B2 * | 2/2005 | Takahashi et al. | ................ | 477/5 |
| 2005/0080540 A1 * | 4/2005 | Steinmetz et al. | .............. | 701/55 |
| 2006/0019785 A1 * | 1/2006 | Holmes et al. | ..................... | 475/5 |

FOREIGN PATENT DOCUMENTS

DE 10207699A1 A1 9/2003

* cited by examiner

*Primary Examiner* — Justin Holmes
(74) *Attorney, Agent, or Firm* — Quinn Law Group, PLLC

(57) ABSTRACT

A powertrain is provided having an engine operable in a reverse direction so that a reverse mode is provided through an electrically variable transmission without relying on pure electric or series electric operation, and without the addition of a dedicated reverse gear. A method of controlling such a powertrain is also provided.

11 Claims, 6 Drawing Sheets

| Mode | Clutch/Motor |
|---|---|
| Launch/EVT Mode1 | 22 C1 G 20A M 20B |
| 1st Fixed | 22 C1 C4 |
| 2nd Fixed | 22 C1 C2 |
| EVT Mode 2 | 22 C2 G/M 20A M/G 20B |
| 3rd Fixed | 22 C2 C4 |
| 4th Fixed | 22 C2 C3 |

HYBRID POWERTRAIN WITH REVERSING ENGINE AND METHOD OF CONTROL

TECHNICAL FIELD

The invention relates to a powertrain having an engine and an electrically variable transmission, wherein a crankshaft of the engine can be controlled to rotate in two different directions, as well as to a method of controlling a powertrain.

BACKGROUND OF THE INVENTION

Hybrid automotive powertrains have typically used pure electric or series electric operation to provide reverse torque at a transmission output member. Pure electric operations utilize battery power to power a motor which is controlled to turn a transmission member, such as a gear, in a direction resulting in reverse rotation of the output member. In series electric operation, engine power allows one motor to operate as a generator that provides electricity to power a second motor which in turn drives a transmission member in a direction to provide a reverse rotation at the output member. Vehicle reverse performance, particularly for steep grades and long distances at high or low temperatures, is therefore limited by battery or motor behavior in both of these types of powertrains. Utilizing the engine, rather than motor power, to provide reverse, in either a fixed ratio mode or an electrically variable mode, typically requires the addition of one or more gears dedicated for use in the reverse mode, thereby adding length to the transmission and decreasing efficiency due to clutch drag and spin losses.

SUMMARY OF THE INVENTION

A powertrain is provided having an engine operable in a reverse direction so that a reverse mode is provided through an electrically variable transmission without relying on pure electric or series electric operation, and without the addition of a dedicated reverse gear.

Specifically, a powertrain is provided having an engine with a crankshaft rotatable in a first direction and in a second direction. A controller is configured to control direction of the crankshaft. The powertrain further includes an electrically variable transmission that has an input member, such as in input shaft, operatively connected with the crankshaft and an output member, such as an output shaft, for providing driving torque. The output shaft rotates in a forward direction when the crankshaft rotates in the first direction, and rotates in a reverse direction when the crankshaft rotates in the second direction. Thus, forward and reverse torque are alternately provided.

More specifically, the engine may include an engine block forming cylinders and a respective intake valve and exhaust valve for each cylinder. The valves are openable and closable for allowing combustion of gas within the cylinders to cause rotation of the crankshaft in the first direction.

The electrically variable transmission may include a transmission gearing arrangement characterized by an absence of a reverse gear. The input shaft is operatively connected with the engine crankshaft such that torque is transferred from the crankshaft to the transmission input shaft and ultimately to the output shaft, which rotates in a forward direction when the crankshaft rotates in the first direction.

The controller is be configured to selectively change the direction of the engine crankshaft so that the engine crankshaft rotates in a second direction causing the transmission output shaft to rotate in a reverse direction. Thus, the direction of rotation of the engine crankshaft determines whether a forward or reverse torque is provided at the transmission output shaft, and a power flow path from the transmission input member to the transmission output member is identical regardless of the direction of rotation of the crankshaft. As used herein, a "power flow path" is defined as the components of the electrically variable transmission (i.e., the shafts and gears) along which power flows (i.e., which carry torque) from the input member to the output member. The engine that may be referred to as a "reversing engine" as it is controllable to provide crankshaft rotation in two directions corresponding with rotation of the transmission output member in a forward direction and a reverse direction.

The electrically variable transmission further includes a motor/generator operatively connected to the transmission gearing arrangement. An energy storage device, such as a battery, is operatively connected to the motor/generator for providing power to and receiving power from the motor/generator to thereby vary speed of rotation of the transmission output shaft.

Preferably, the electrically variable transmission is controllable by the controller to selectively provide both a fixed ratio operating mode and an electrically variable operating mode. Either of these modes may be selected when the crankshaft rotates in the first direction or when the crankshaft rotates in the second direction (e.g., a fixed ratio operating mode and an electrically variable operating mode are available in both forward driving and reverse driving). As used herein, a "mode" is a particular operating state, whether encompassing a continuous range of speed ratios or only a fixed speed ratio, achieved by engagement of one or more particular torque-transmitting mechanisms. Because the direction of rotation of the transmission output member is determined by the direction of rotation of the crankshaft, and not by the use of any reversing gears, identical power flow paths through the electrically variable transmission may be used for forward modes as for reverse modes.

Various alternative embodiments are provided that enable the crankshaft to rotate in a second direction such that reverse torque is provided. In one embodiment, high authority, electrically-actuated cam phasers are used to shift the order of intake and exhaust valve operation to provide reverse operation. Specifically, the intake valves are operatively connected to a first overhead camshaft that causes opening and closing thereof, and the exhaust valves are operatively connected to a second overhead camshaft that causes opening and closing of the exhaust valves. A respective, electrically-actuated cam phaser is operatively connected to each of the camshafts and is operable for varying the phasing of the overhead camshaft relative to the crankshaft. The cam phasers each have phasing authority of at least 180 degrees crank angle; 90 degrees cam angle, so that the crankshaft may rotate in the first or second direction in response to the cam phasers with proper gas flow through the intake and exhaust plumbing.

In another alternative embodiment, cam-switching mechanisms are utilized to reverse the order of intake and exhaust valve operation. Specifically, the first overhead camshaft operatively connected to the intake valves and the second overhead camshaft operatively connected to the exhaust valves each have a respective forward cam lobe and reverse cam lobe for each respective valve. The cam-switching mechanism is controlled to selectively connect respective forward and reverse cam lobes with the valves to control whether the crankshaft rotates in the first direction or the second direction such that the forward or reverse driving torque is provided at the transmission output shaft, respectively.

Yet another embodiment for an engine having overhead camshafts is to provide a three dimensional cam for each respective valve. The three dimension cam has both a forward and reverse cam profile. One or more actuators axially translate each camshaft so that the three dimensional cams transition between the forward and reverse cam profiles under the control of the controller to provide crankshaft rotation in the first or second direction, respectively, depending on whether forward or reverse torque is desired at the transmission output shaft.

Yet another embodiment uses a camless valve actuation system, with the controller selectively causing opening and closing of the valves so that the crankshaft rotates in the first and the second directions in response to the camless valve actuation system. The camless valve actuation system may be of an electro-hydraulic or electro-magnetic type, as is known to those skilled in the art.

Using any of these embodiments to provide a shift in the order of the intake and exhaust valve operation, the engine can be restarted using the hybrid transmission motor and the valves controlled to provide crankshaft rotation in the second direction corresponding with reverse torque at the transmission output shaft. The transmission can be controlled to establish the same electrically variable and, preferably, fixed ratio operating modes that are available in the forward direction, but with a reverse torque at the transmission output shaft.

In a powertrain having an electrically variable transmission, engine accessories are typically electrically driven via a dedicated motor or via one of the motor/generators of the electrically variable transmission. Some accessories however, such as engine pumps for oil and coolant flow, are typically driven by the engine crankshaft or camshaft. Accordingly, alternative embodiments for ensuring correct rotation of crankshaft-driven accessories and pumps are provided, to ensure rotation even when the crankshaft rotates in the second direction. For example, an accessory device, such as a dual-drive air conditioning compressor, may be driven by the engine crankshaft via an endless rotatable device such as a chain or belt. In such an embodiment, the controller is configured to control the powertrain so that the accessory device is driven by the engine through the endless rotatable device when the crankshaft rotates in the first direction, but is driven by a motor operatively connected to the accessory device when the crankshaft rotates in the second direction due to the change in operation of the intake and exhaust valves.

Additionally, structure may be provided to ensure that crankshaft-driven pumps, such as an engine pump for oil and coolant flow, are able to maintain a predetermined flow regardless of the direction of rotation of the crankshaft. Thus, such a pump that is operatively connected with the controller and drivingly connected with the crankshaft for providing a predetermined flow of fluid when the crankshaft rotates in the first direction may also provide the predetermined flow of fluid when the crankshaft rotates in the second direction. This is accomplished via an electrically-actuated reversing valve in fluid communication between the crankshaft and the pump and operatively connected to the controller. The controller is configured to actuate the electrically-actuated reversing valve when the crankshaft rotates in the second direction.

Alternatively, for accessories driven by the engine crankshaft through an auxiliary drivetrain, engine drive may be utilized regardless of the direction of the rotation of the engine crankshaft by providing a rotating member, such as a gear or sprocket, that is selectively engageable via the controller with the auxiliary drivetrain when the crankshaft rotates in the second direction to change the direction of rotation of the auxiliary drivetrain so that the accessory is driven in the same predetermined direction as when the engine crankshaft rotates in the first direction.

A method of controlling the powertrain is associated with any of the above described powertrain embodiments. Specifically, a controller is configured to carry out the method by receiving a request for rotation of the output shaft in either the forward direction or the reverse direction. The request may be associated with a vehicle operator shifting a selector between a forward drive mode and a reverse drive mode. Under the method, intake and exhaust valves of the engine are then lifted according to a first predetermined phasing with respect to rotation of the crankshaft, thereby causing the crankshaft to rotate in a first direction that corresponds with rotation of the output member in the forward direction if the received request is for rotation of the output shaft in the forward direction. Conversely, if the received request is for rotation of the output member in the reverse direction, the method includes lifting the intake and exhaust valves according to a second predetermined phasing with respect to rotational of the crankshaft. The second predetermined phasing substantially opposes the first predetermined phasing, thereby causing the crankshaft to rotate in a second direction that corresponds with rotation of the output member in the reverse direction. A power flow path through the transmission is the same when the valves are lifted according to the first phasing as when the valves are lifted according to the second phasing.

Depending on the structure to cause lifting of the intake and exhaust valves, the lifting steps in the method may include actuating cam phasers operatively connected to the valves, engaging a different respective cam profile with each of the valves, or axially moving a camshaft characterized by different respective cam profiles, as described with respect to the various embodiments above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
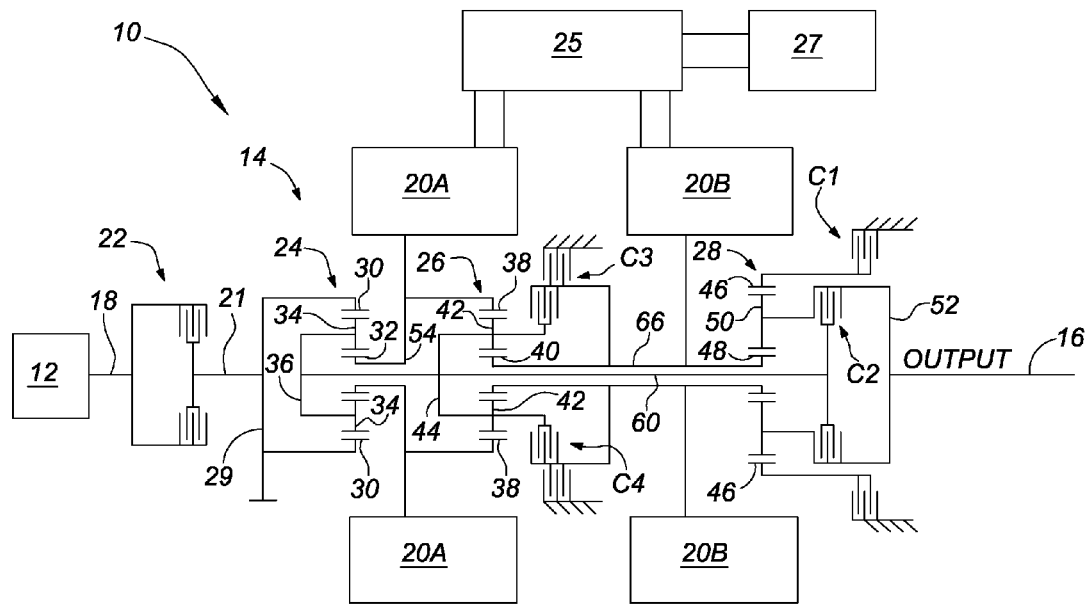
FIG. 1 is a schematic illustration of a powertrain within the scope of the invention.
FIG. 2 is a chart showing a clutch engagement schedule and motor operating conditions for various operating modes for the powertrain of FIG. 1.

Referring to the drawings, wherein like reference numbers refer to like components, FIG. 1 depicts a powertrain 10 having an engine 12 operatively connected to an electrically variable transmission 14. The engine 12 is controllable to provide reverse torque at an output member 16 (also referred to herein as an output shaft) of the transmission 14 by changing the direction of rotation of the engine crankshaft 18, as described below. This allows reverse torque to be provided using engine power, without requiring that any additional gears be added to the electrically-variable transmission (i.e., any dedicated gear used only for a reverse operating mode, referred to herein as a "reverse gear") and without requiring that the reverse torque be provided electrically, by the motor-generators 20A and 20B included in the transmission 14. The reverse torque is thus not limited by the electrical power available to the motor/generator.

The crankshaft 18 is operatively connected for rotation with an input member 21 of the transmission 14 through a torque-transfer device 22. The electrically variable transmission 14 includes a transmission gearing arrangement 23 that utilizes three planetary gear sets 24, 26 and 28 to interconnect the input member 21, the output member 16 and the motor/generators 20A, 20B to establish various powerflow paths from the input member 21 to the output member 16, depending on which of the various torque-transmitting mechanisms, brake C1, clutch C2, brake C3 and clutch C4 are engaged, as well as whether the motor/generators 20A, 20B are respectively operating as motors or as generators. Planetary gear set 24 includes ring gear member 30, sun gear member 32, and carrier member 36 that rotatably supports planet gears 34 that intermesh with both the ring gear member 30 and the sun gear member 32. Planetary gear set 26 includes ring gear member 38, sun gear member 40, and carrier member 44 that rotatably supports planet gears 42 that intermesh with both the sun gear member 40 and the ring gear member 38. Planetary gear set 28 includes ring gear member 46, sun gear member 48 and carrier member 52 that rotatably supports planet gears 50 that intermesh with both sun gear member 48 and ring gear member 46. Interconnecting member 54 continuously interconnects sun gear member 32 with ring gear member 38 and with motor/generator 20A. Interconnecting member 60 continuously interconnects carrier member 36 with carrier member 44 and is selectively connectable with carrier member 52 via engagement of clutch C2.

As those skilled in the art will readily understand, a controller 25 is operatively connected to the motor/generators 20A, 20B, as well as to an energy storage device 27, such as a battery, to selectively transfer power from the energy storage device 27 to either of the motor/generators or vice versa, and to control the respective direction of rotation of each of the motor/generators. When the powertrain 10 is used in a land vehicle, the transmission output member 16 may be connected to the vehicular axles (not shown) that may, in turn, terminate in the drive members (also not shown). The drive members may be either front or rear wheels of the vehicle on which they are employed, or they may be the drive gear of a track vehicle.

A drive gear 29 may be presented from the input member 21. As depicted, the drive gear 29 fixedly connects the input member 21 to the outer gear member of the first planetary gear set 24, and the drive gear 29, therefore, receives power from the engine 12 and/or the motor/generators 20A and/or 20B. The drive gear 29 can be operatively connected to a transmission pump or a power take-off unit to drive various vehicle accessories, as explained with respect to FIGS. 8-10 described below.

FIG. 2 is a chart showing the torque-transmitting mechanism engagement schedule and operating conditions of the motor/generators to provide various forward operating modes for the powertrain 10. Two electrically-variable modes are provided (Launch/EVT Mode 1 and EVT Mode 2) as well as four fixed ratio modes (denoted as $1^{st}$, $2^{nd}$, $3^{rd}$ and $4^{th}$ in FIG. 2). For each mode, the engaged torque-transmitting mechanisms are listed and whether either or both of the motor/generators 20A and 20B are controlled to operate as motors (denoted as M) or generators (denoted as G) is indicated. In each of these modes depicted in the chart, the engine 12 is also controlled by the controller 25 such that the crankshaft 18 rotates in a first direction, which may be clockwise. By controlling the engine 12 so that the crankshaft 18 rotates in a first direction, and by controlling the torque-transmitting mechanisms and the motor/generators as indicated, the resulting modes shown all result in the output member 16 rotating in a forward direction (i.e., a direction that corresponds with forward rotation of attached drive wheels).

For example, as electrically variable operating mode referred to in the chart as "Launch/EVT Mode 1" is provided by engaging torque-transmitting mechanism 22, the brake C1, and operating the motor/generator 20A as a motor.

In the first mode of operation, and when the controller 25 has determined that the operator desires to move forward from a stationary condition, and to accelerate, the torque transfer device 22 is engaged to operatively connect the engine 12 to the electrically variable transmission 14, and torque transfer device 22 remains applied as the vehicle moves forward through a speed range hereinafter more fully described. The torque transfer device C2 is not applied, and it remains disengaged. The torque transfer device C1 is engaged. In this situation, the engine 12 applies driving power to the ring gear member 30 of the first planetary gear set 24 so the ring gear member 30 rotates in unison with the input member 21 (and thus the engine 12). The first motor/generator 20A simultaneously rotates the sun gear member 32 of the first planetary gear set 24 and the ring gear member 38 of the second planetary gear set 26 in the same direction, thus driving the carrier member 36 in the same direction which effects rotation of the sun gear member 40 of the second planetary gear set 26.

The second motor/generator 20B operates as a motor during the first mode, and as such motor/generator 20B drives sleeve shaft 66 in that direction which rotates the sun gear member 48 of the third planetary gear set 28 to rotate the planet gears 50 of the third planetary gear set 28 against the ring gear member 46 of the third planetary gear set 28. The ring gear member 46 is fixed by having been grounded so that the carrier member 52 drives the output member 16 in that direction required to effect forward movement of the vehicle.

That rotation of the sleeve shaft 66 effected by rotation of the second motor/generator 20B operating as a motor also rotates the sun gear member 40 of the second planetary gear set 26. Because the torque transfer device C2 remains disengaged, the carrier members 36 and 44 of the first and second planetary gear sets 24 and 26, respectively, are freely rotatable—but only in unison inasmuch as the two carrier members 36 and 44 are compounded. As a result, the rotation of the ring gear member 30 of the first planetary gear set 24 effected by the engine 14 and the rotation of the sun gear member 40 effected by the second motor/generator 20B force the sun gear member 32 of the first planetary gear set 24 and the conjoined ring gear member 38 of the second planetary gear set 26 to drive the first motor/generator 20A in that direction, and velocity, which causes the first motor/generator 20A, at least initially, to serve as a generator.

Accordingly, in the first Launch/EVT Mode 1, a power path through the transmission 14 includes the input member 21, the ring gear member 30, sun gear member 32 (connected with motor/generator 20A operating as a generator), ring gear member 38, carrier member 36, sun gear member 40 (connected with motor/generator 20B operating as a motor), sleeve shaft 66, sun gear member 48, planet gears 50, ring gear member 46, carrier member 52 and output member 16.

In the transmission 14, both fixed ratio modes and electrically variable modes are used to improve performance or efficiency. Starting in Launch/EVT Mode I, the first motor/generator 20A operates as a generator until approximately 7 MPH. At about 7 MPH, torque-transmitting mechanism C4, referred to as the lock-up clutch, is engaged while the brake C1 remains engaged. In this configuration, the transmission 14 is engaged in the first fixed ratio as defined by the planetary gear set 28, as illustrated in the table of FIG. 2. When the clutch C4 is engaged, the first two gear sets 24, 26 and motor/generators 20A, 20B rotate at the input speed, and are connected with the sun gear member 48, and with the clutch C1 also engaged there is a speed reduction provided by planetary gear set 28 and torque is multiplied. All power is transmitted mechanically through the planetary gear sets. With no torque present in the motors/generators 20A, 20B, there are no electrical losses, thus providing a higher efficiency operation, however, with full torque applied in motor/generators 20A, 20B, a significant increase in performance can be realized. With both motors locked together by lock-up clutch C4, they also can share equally any regenerative power, thereby resulting in higher braking performance with improved cooling. Only the planetary gear set 28 is active because the lock-up clutch C4 locks up the planetary gear sets 24 and 26. Engagement of the torque transmitting device C4 also protects the motors/generators 20A, 20B if the power flow necessary for power split operation is more than the motors/generators 20A, 20B would tolerate. Therefore, if the vehicle is towing or hauling up a hill, then the motors/generators 20A, 20B are protected.

In normal operation, only the clutch C1 would be engaged at low speeds, but if maximum power is demanded, then the lock-up clutch C4 is also engaged. The motor/generators 20A, 20B may be turned on with the clutch C4 to achieve maximum available horsepower, and the motors/generators' 20A, 20B power may be reduced to reduce operating temperatures. The clutch C4 also provides the ability for the engine 12 and both motor/generators 20A, 20B, to all three simultaneously propel the vehicle for maximum acceleration.

Accordingly, in the first fixed ratio mode, a power path through the transmission 14 includes the input member 21, the planetary gear sets 24 and 26, all locked to rotate at the same speed, sun gear member 48, planet gears 50, carrier member 52 and output member 16.

At about 40 MPH, the lock-up clutch C4 is disengaged. Thereafter, the motor/generator 20B acts as a motor, and the motor/generator 20A acts as a generator up to a mechanical point wherein the motor/generator 20A is stationary. The motor/generator 20A then reverses direction and acts as a motor. The clutch C2 is then engaged at about 57 MPH. With the clutches C1 and C2 engaged, a second fixed ratio is achieved. All three gear sets 24, 26, 28 are active. The motors/generators 20A, 20B may be turned off during the engagement of the clutches C1 and C2 for fully mechanical operation. During the second fixed ratio, the motors 20A, 20B may freewheel and no torque is present. At about 70 MPH, the clutch C1 is disengaged and the clutch C2 remains engaged for the high-efficiency second mode of operation, EVT Mode 2.

The transition from the second fixed ratio to EVT Mode 2 of operation is achieved by disengaging torque-transmitting mechanism C1 and continuing the application of torque transfer device C2. Similar to the previously described EVT Mode I overlap with fixed ratios, EVT Mode 2 overlaps fixed ratios in the truth table of FIG. 2, as determined by internal and engine speed limitations. At the inception of the EVT Mode 2 of operation, the first motor/generator 20A transitions from freewheeling or operating as a motor to operating as a generator, however this is influenced by the planetary gear ratio selections. The first motor/generator 20A continues to operate as a generator during operation of the transmission 14 in EVT Mode 2 while the vehicle gains speed from about 70 MPH to about 88 MPH. At about 88 MPH the first motor/generator 20A transitions from operation as a generator back to operation as a motor as it transitions through a mechanical point wherein the motor/generator 20A has zero rotational speed. The first motor/generator 20A continues thereafter to operate as a motor.

At the beginning of the EVT Mode 2 of operation, the second motor/generator 20B continues to operate as a motor. In fact, the second motor/generator 20B operates as a motor until the vehicle reaches a speed of about 88 MPH, at which point it transitions to operation as a generator, and continues thereafter to operate as a generator.

With the configuration of the transmission 14 heretofore described, and with the aforesaid number of teeth on the inner and outer gear members, the transmission 14 provides two mechanical points while operating in EVT Mode 2. That is, the first motor/generator 20A has a zero rotational speed at about 88 MPH. In addition, the second motor/generator 20B has a zero rotational speed at about 208 MPH. Hence, the transmission 14 provides two mechanical points in EVT Mode 2 operation.

As illustrated in the fixed ratio table of FIG. 2, third and fourth fixed ratios are available. The third fixed ratio may be established with the simultaneous engagement of the clutches C2 and C4, which locks all gear sets into a 1:1 ratio so that the output member 16 rotates at the same speed as the input member 21. The fourth fixed ratio is established with the engagement of the clutches C2 and C3, as illustrated in the fixed ratio table of FIG. 2. In the fourth fixed ratio, the first and second planetary gear sets 24 and 26 are active, and the motors/generators 20A, 20B may freewheel with no torque present.

Accordingly, the transmission 14 provides three mechanical points and four available fixed ratios, thereby minimizing electrical losses in the motors/generators while providing maximum power quickly in EVT Mode 1 via the lock-up clutch C4. Exemplary numerical values for the first, second, third and fourth fixed ratio modes of 3.7, 1.7, 1.0 and 0.74 are achieved by utilizing ring gear members 30 and 38 in each of the first and second planetary gear sets 24 and 26 that have 65 teeth, and sun gear members 32 and 40 in each of the first and second planetary gear sets 24 and 26 that have 33 teeth, a ring gear member 46 of the third planetary gear set 28 that has 94 teeth, and an sun gear member 48 of the third planetary gear set 28 that has 34 teeth.

Those skilled in the art will readily be able to determine the power flow paths through the transmission 14 established during the second, third and fourth fixed ratio modes.

If the engine 12 was not controllable to cause the crankshaft 18 to rotate in a second, e.g., counterclockwise direction, then a reverse mode could be provided by having the controller 25 operate the second motor/generator 20B as a motor, but reversing its rotational direction from the direction in which the second motor/generator 20B rotates for launch in the first mode electrically variable mode of operation, EVT Mode 1.

As discussed above, relying on the second motor/generator 20B to carry out a reverse mode limits the reverse operation to available battery power and motor torque. Accordingly, instead, various methods of controlling the engine 12 so that the crankshaft 18 is rotatable in a second direction allows the same modes of operation listed in FIG. 2 to be achieved, using the same power flow paths, with the same clutches, components and motor/generators operating in the same manner, although rotating in opposite directions, so that the output member 16 rotates in a reverse direction.

Figure 3:
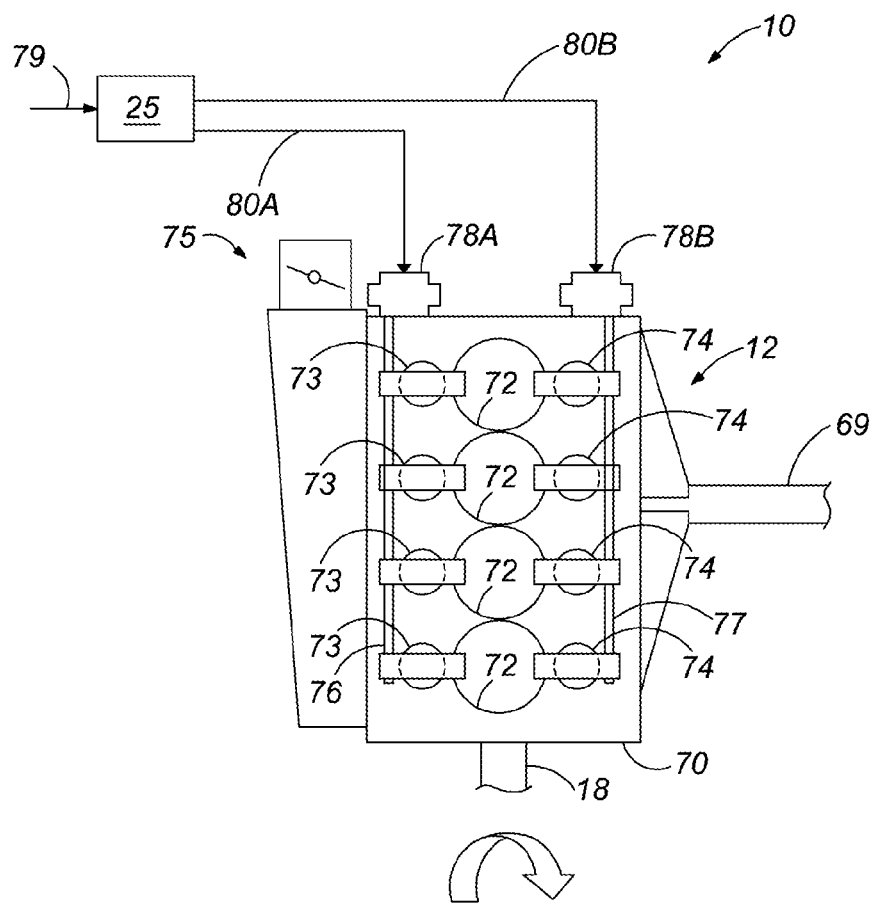
FIG. 3 is one embodiment of an engine and controller for the powertrain of FIG. 1.

Referring to FIG. 3, a portion of the powertrain 10 shows a more detailed view of one embodiment of the engine 12. The engine 12 includes an engine block 70 having cylinders 72 formed or otherwise provided therein. An intake valve 73 and an exhaust valve 74 are operatively connected to each of the cylinders 72 and are openable and closeable for allowing combustion of gas within the cylinders 72 to cause rotation of the crankshaft 18. Those skilled in the art readily understand the introduction of intake air through a throttle 75 and intake passages (not shown) into fluid communication with the intake valve 73. Additionally, fuel is fed to the cylinder 72 via an electric fuel feed pump (not shown). Fuel in the cylinders is ignited to combust, driving pistons within the cylinders that are operatively connected to the crankshaft 18, thereby rotating the engine crankshaft 18, as is understood by those skilled in the art. The exhaust valves 74 open to allow exhausting of the combusted gases through exhaust passage 69. Sensors in signal communication with the controller 25 may be provided in the intake ports to the valves and in the exhaust air flow so that the controller 25 can regulate the air fuel mixture and the engine 12.

A first overhead camshaft 76 is operatively connected with the intake valves 73 via cam lobes, and rotates to cause reciprocal opening and closing of the intake valves 73. Similarly, a second overhead camshaft 77 is operatively connected with the exhaust valves 74 and is provided with cam lobes and rotates to reciprocally open and close the exhaust valve 74. A high authority electrically-actuated intake cam phaser 78A is operatively connected to the overhead camshaft 76 to control the phasing of the camshaft 76 with respect to the crankshaft 18. Similarly, a high authority electrically-actuated exhaust cam phaser 78B is operatively connected with the second overhead camshaft 77 to control phasing of the camshaft 77 relative to the crankshaft 18. Each of the cam phasers 78A and 78B are "high authority", which is defined herein to mean having a phasing authority of not less than 180 degrees crank angle; 90 degrees cam angle. Phasing authority is the range of rotation of the camshaft controllable by the cam phaser. The cam phasers 78A and 78B are operatively connected to the controller 25. An input request signal 79 to the controller 25 is processed by the controller 25 to determine the desired phasing of the intake valves 73 and exhaust valves 74 relative to the crankshaft 18. The input request signal 79 (i.e., an input signal) may be provided by sensor and actuator signals responding to an operator request for driving torque in a forward direction or a reverse direction, such as by manipulation of an accelerator pedal or a manual gear shift device With the high authority phasing available through the phasers 78A, 78B, the controller 25 can process a first predetermined phasing of the intake and exhaust cam phasers 78A and 78B if the input request signal 79 is for rotation of a transmission output member 16 of FIG. 1 in a forward driving direction. This causes the crankshaft 18 to rotate in a first direction (represented as a clockwise direction) as indicated by the arrow in FIG. 3. Alternatively, if the input request signal 79 is for rotation of the output member 16 in a reverse direction, the controller 25 can send the respective control signals 80A, 80B to the phasers 78A and 78B to cause a second predetermined phasing of the camshafts 76 and 77 such that the intake and exhaust valves 73 and 74 are lifted according to the second predetermined phasing. This causes the crankshaft 18 to rotate in a second direction (e.g., a counterclockwise direction). Regardless of the direction of rotation of the crankshaft 18, the electrically variable transmission 14 connected thereto (shown in FIG. 1) may be controlled to achieve the same modes depicted in FIG. 2 whether the crankshaft rotates in the first direction or in the second direction.

One example of an electrically-actuated cam phaser includes an electric-motor driven worm gear actuator that varies the phasing of a camshaft relative to a crankshaft through a planetary gear set. The worm gear actuator includes a worm gear rotatably driven by a worm that is driven by the electric motor. The planetary gear set includes a sun gear member connected for rotation with the worm gear, a carrier member connected for rotation with the camshaft and a ring gear member operatively connected to the crankshaft through a drive sprocket carried on the crankshaft, a driven sprocket carried on the ring gear member, and chain connecting the sprockets. The worm gear is connected with an actuator shaft to the sun gear to provide a driving connection between the worm gear and the sun gear member. In order to change the phase relation of the camshaft with respect to the crankshaft while the engine is operating, the electric motor is rotated in a desired direction by energizing the motor from an external controller. Rotation of the motor rotates the worm, causing the worm gear to oscillate about its axis and thereby reposition or change the rotational position of the sun gear member in the planetary gear set. This change causes relative rotation of the planet carrier member within the driven sprocket, thereby rotating the camshaft and changing its phase with respect to the driven sprocket and the directly connected crankshaft. The motor may be driven in forward or reverse directions to either advance or retard the camshaft phase angle and control the actuation of associated engine valves with respect to the timing of the crankshaft as desired.

Figure 4A:
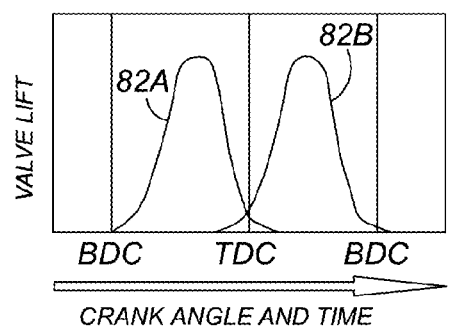
FIG. 4A is a graph illustrating engine valve lift vs. time for forward operation of the engine of FIG. 3.

FIG. 4A illustrates valve lift profile when the input request signal 79 is for torque at the output member 16 in a forward driving direction, as provided by the phasing of the high authority intake cam phases 78A, 78B of FIG. 3. As crankshaft 18 crank angle and time increase moving from left to right (i.e., as pistons within the cylinders 72 move from bottom dead center to top dead center to bottom dead center positions), the valve lift profile 82A of a given exhaust valve 74 lifts and lowers prior to the valve lift profile 82B of the corresponding intake valve 73 (i.e., the intake valve 73 operatively connected with the same cylinder 72 as the given exhaust valve 74).

Figure 4B:
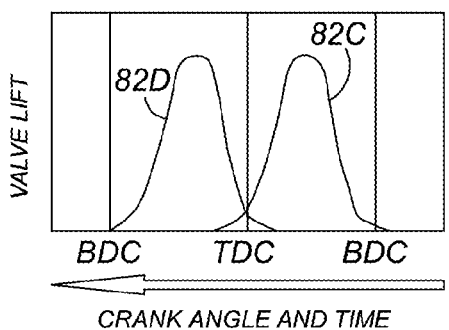
FIG. 4B is a graph illustrating engine valve lift vs. time for reverse operation of the engine of FIG. 3.

FIG. 4B illustrates valve lift of the valves 73 and 74 according to the phasing of the cam phasers 78A and 78B under control of the controller 25 when the input request signal 79 is for torque at the output member 16 in a reverse driving direction. In reverse operation with crank angle and time increasing moving from right to left, the valve lift profile 82C of a given exhaust valve 74 precedes the valve lift profile 82D of a corresponding intake valve 73.

Figure 5:
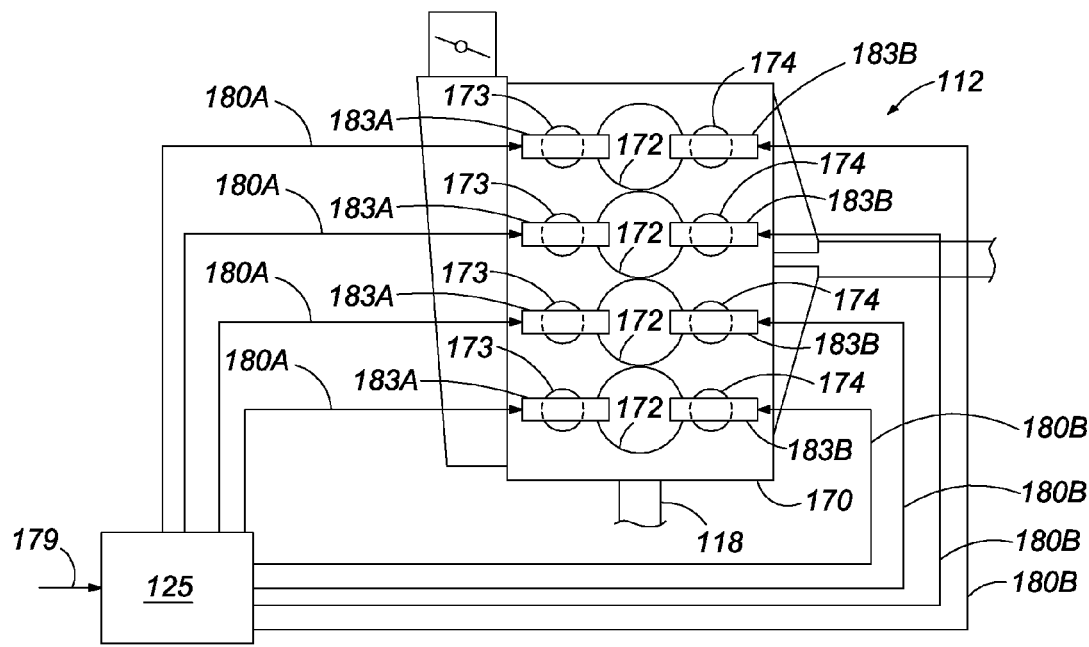
FIG. 5 is a second alternative embodiment of an engine and controller for the powertrain of FIG. 1.

Referring to FIG. 5, an engine 112 that may be used in place of engine 12 in the powertrain 10 of FIG. 1 is depicted. The engine 112 has a fully-flexible, camless valve actuation system. An engine block 170 is formed or otherwise provided with cylinders 172. Intake valves 173 and exhaust valves 174 are openable and closeable to allow combustion of gas within the cylinders 172, as is understood by those skilled in the art. (The intake valves 173 and exhaust valves 174 are partially obscured by respective intake valves actuators 183A operatively connected to each of the intake valves 173 and exhaust valve actuators 183B operatively connected to each of the exhaust valves 174.) The controller 125 responds to an input request signal 179 for driving torque of the output member 16 of FIG. 1 in either a forward driving direction or a reverse driving direction. In accordance with the input request signal 179, the controller 125 sends control signals 180A and 180B to each of the intake valve actuators 183A and exhaust valve actuators 183B. The actuators 183A and 183B may be of the electro-hydraulic or electro-magnetic variety or any other variety able to respond to an electrical control signal, such as control signals 180A and 180B, to vary the opening and closing of the intake valves 173 and exhaust valves 174, respectively. An electro-hydraulic camless valve actuation system may employ a manifold housing high pressure oil. The body of the manifold may have channels formed lengthwise therein, with switching valves on the body operative to alternately communicate oil in the channels with cylinder valves (i.e., intake and exhaust valves) of an engine to which the manifold is mounted to affect movement of the cylinder valves. An electro-magnetic camless valve actuation system would rely on electric current in a magnetic field producing motion to open and close valves that affect opening and closing of the cylinder valves.

Because the actuators 183A, 183B are not dependent upon a rotating camshaft to provide opening and closing of the valves 173, 174, they are "fully flexible". Thus, the controller 125 can control the actuators 183A and 183B to cause rotation of the crankshaft 118 in the first direction, as indicated by the arrow shown, corresponding with a forward direction of the rotation for the output member 16 of FIG. 1 or in a second direction (counterclockwise), corresponding with rotation of the output member 16 in a reverse direction.

Figure 6A:
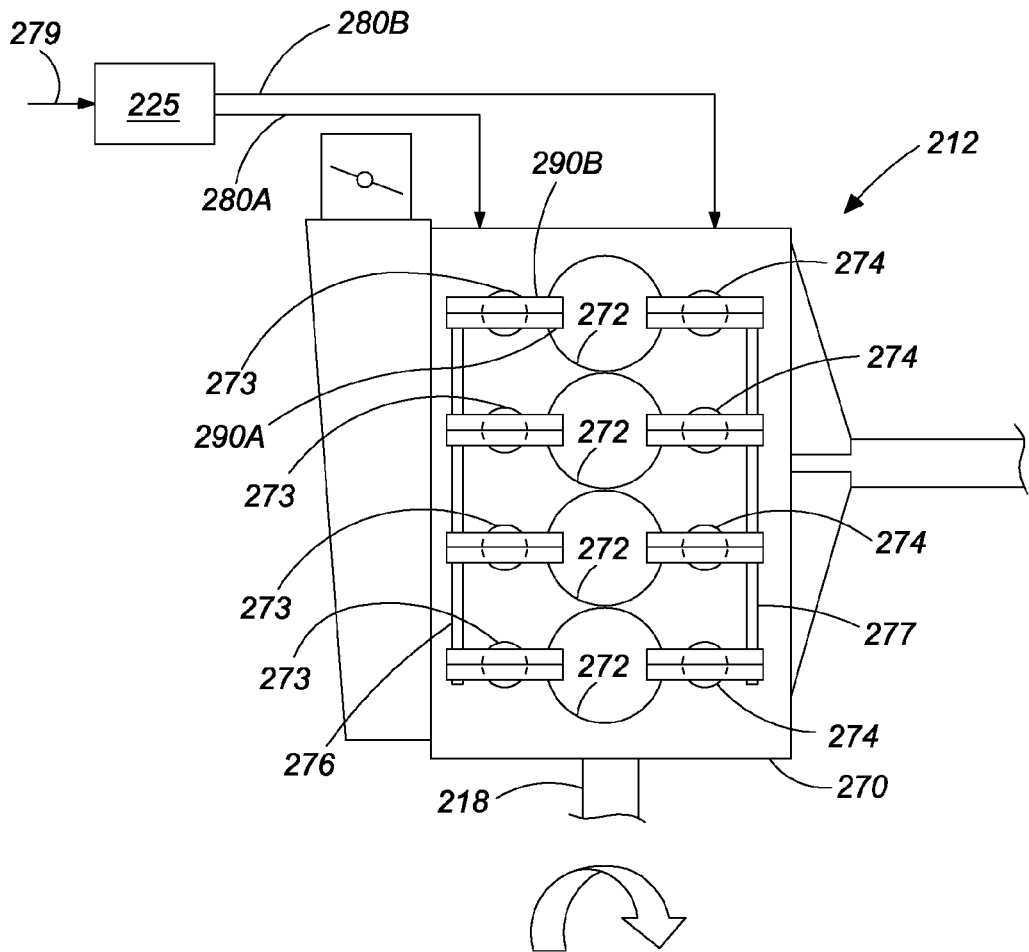
FIG. 6A is a third alternative embodiment of an engine and controller for the powertrain of FIG. 1.
Figure 6B:
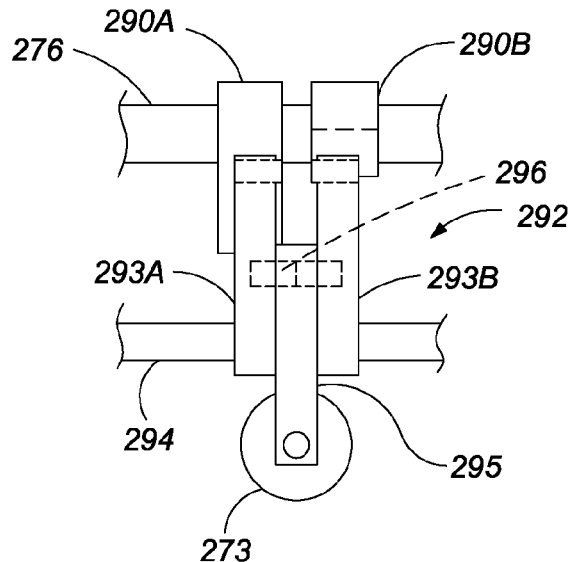
FIG. 6B is a fragmentary top view of a camshaft, a cam-switching mechanism, and a valve used in the engine of FIG. 6A.

Referring to FIG. 6A, an alternative engine 212 and controller 225 that may be used in the powertrain of FIG. 1 is depicted. The engine 212 has an engine block 270 formed or otherwise provided with cylinders 272. An intake valve 273 and an exhaust valve 274 correspond with each cylinder 272. Multiple cam lobes 290A, 290B are operatively connectable to each of the intake valves 273 and exhaust valves 274. The multiple cam lobes 290A, 290B are supported on camshafts 276 and 277 and are better viewed in FIG. 6B. In FIG. 6B, one set of multiple cam lobes 290A, 290B is shown connected for rotation with the camshaft 276 and in operative connection with one of the intake valve 273. It should be understood, that other like cam lobes 290A, 290B are in operative communication with each of the exhaust valves 274, as well. As shown in FIG. 6B, cam lobe 290A is a reverse cam lobe and is generally 180 degrees crank angle; 90 degrees cam angle out of phase with the forward cam lobe 290B (with a dashed line indicating the outermost tip of the lobe nose extending in a forward direction). A cam switching mechanism 292 is hydraulically or electrically controllable by the controller 225 to switch between the reverse cam lobe 290A and the forward cam lobe 290B to control which cam lobe operatively communicates and controls lifting of the valve 273. The cam switching mechanism 292 includes a reverse roller finger follower 293A and a forward roller finger follower 293B both of which are pivotable about a pivot shaft 294 on which a rocker arm 295 operatively connected to the valve 273 also pivots. Switching lock pin 296 is controllable to alternatively lock the reverse roller finger follower 293A for common motion with the rocker arm 295 or the forward roller finger follower 293B for common motion with the rocker arm 295. The roller finger follower 293A or 293B that is not locked to the rocker arm 295 by the switching lock pin 296 pivots in lost motion about the pivot shaft with respect to the rocker arm 295. Thus, the position of the switching lock pin 296 controls which of the cam lobe 290A, 290B will operatively communicate with the valve 273, controlling lifting and lowering thereof.

The controller 225 responds to an input request signal 279 for driving torque of the output member 16 of FIG. 1 in either a forward or reverse driving direction. In accordance with the input request signal 279, the controller 225 sends control signals 280A and 280B to each of the switching lock pins 296 disposed at each of the valves 273 and 274. Thus, the controller 225 can control the cam switching mechanisms 292 to cause rotation of the crankshaft 218 in the first direction, as indicated by the clockwise arrow shown, corresponding with a forward direction of rotation for the output member 16 of FIG. 1, or in a second direction (i.e., counterclockwise), corresponding with rotation of the output member 16 in a reverse driving direction.

Figure 7A:
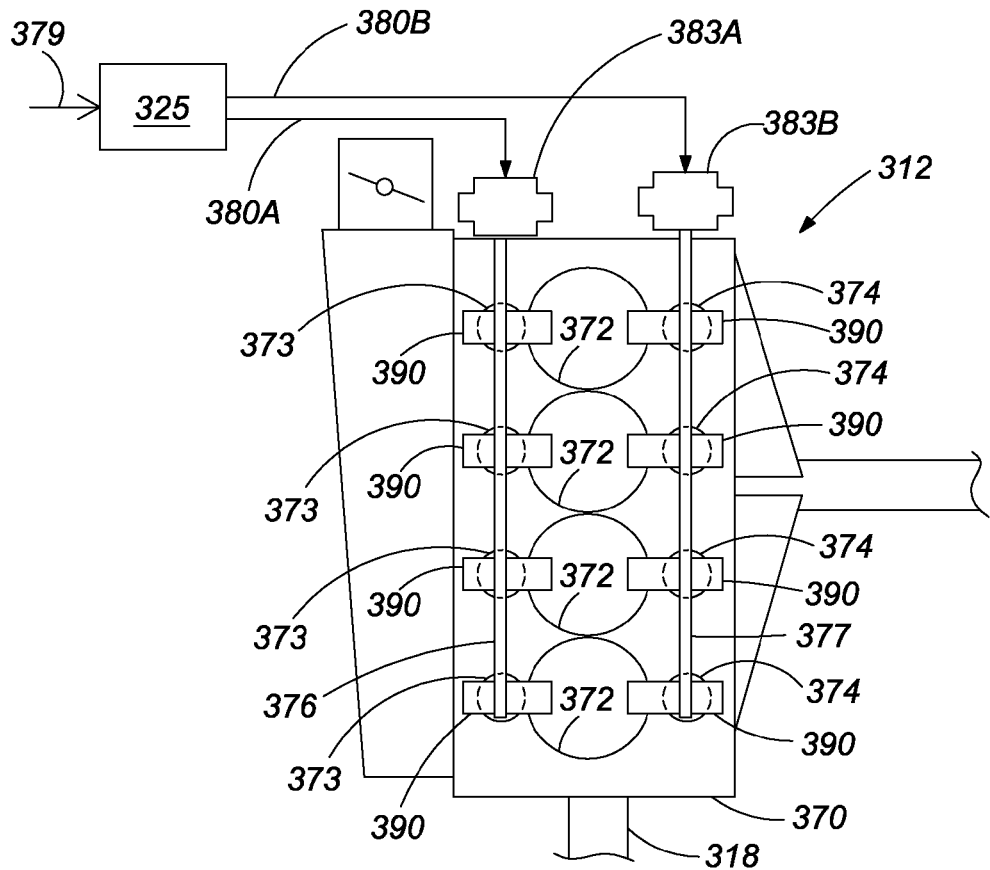
FIG. 7A is a fourth alternative embodiment of an engine and controller for the powertrain of FIG. 1.
Figure 7B:
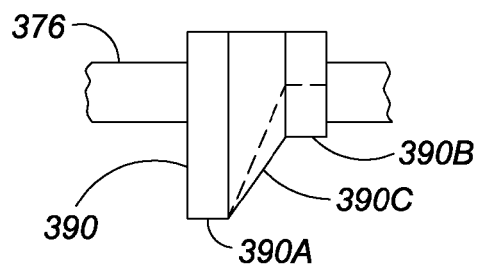
FIG. 7B is a partial fragmentary side view illustration of a portion of a camshaft used in the engine of FIG. 7A.

Referring to FIGS. 7A and 7B, an engine 312 may be used in place of engine 12 in the powertrain 10 in FIG. 1. The engine 312 includes an engine block 370 that is formed or otherwise provided with cylinders 372. Intake valves 373 and exhaust valves 374 are openable and closeable to allow combustion of gas within the cylinders 372, as is understood by those skilled in the art. (The intake valves 373 and 374 are partially obscured by respective three dimensional cams on respective intake valve overhead cam shaft 376 and exhaust valve overhead camshaft 377.)

Each of the camshafts 376 and 377 are formed with three dimensional cam lobes 390 that include a reverse cam profile 390A and a forward cam profile 390B ninety degrees (cam angle) out of phase with the reverse cam profile 390A, with a transitioning portion 390C therebetween. In FIG. 7B, the cam lobes 390 are illustrated with respect to the overhead camshaft 376. A dashed line indicates the outermost tip of the lobe nose on forward cam profile 390B and connects to the outermost tip of the lobe nose on the reverse cam profile 390A. It should be understood that a like three-dimensional cam lobe 390 is positioned for operative engagement with each of the valves 373, 374.

Referring again to FIG. 7A, actuators 383A and 383B serve as an intake cam axially-positioning actuator and an exhaust cam axially-positioning actuator, respectively. The actuators 383A and 383B are translatable to move the respective camshafts 376, 377 axially (i.e., along the axis of rotation of the camshaft). Specifically, a controller 325 responds to an input request signal 379 for driving torque of the output member 16 of FIG. 1 in either a forward driving direction or a reverse driving direction. In accordance with the input request signal 379, the controller 325 sends control signals 380A and 380B to each of the actuators 383A, 383B, respectively. The actuators 383A, 383B respond to the control signals 380A, 380B to translate the respective camshafts 376 and 377 with respect to the intake valves 373 and exhaust valves 374 to determine which of the reverse cam profile 390A or forward cam profile 390B will be in operative engagement with and controlling lifting of the respective valves 373 and 374. If a forward driving torque is desired, the controller 325 will cause actuation of the actuator 383A such that the forward cam profiles 390B are in operative engagement with the intake valve 373. Likewise, the controller 325 will control the actuator 383B such that the reverse cam profiles 390A are in operative engagement with the exhaust valves 374. Under these conditions, the crankshaft 318 will rotate in a first direction, indicated by the arrow shown in FIG. 7A, corresponding with a forward driving direction of the output member 16 of FIG. 1.

If, instead, a reverse driving torque is desired, the controller 325 will control the actuators 383A and 383B to translate the respective camshafts 376 and 377 such that the reverse cam profiles 390A are in operative engagement with the intake valves 373 and the forward cam profiles 390B are in operative engagement with the exhaust valves 374. Under these conditions, the crankshaft 318 rotates in a second direction (i.e., a counterclockwise direction), corresponding with a reverse driving direction for the output member 16 of FIG. 1. A transitioning section 390C of each three dimensional cam 390 allows a smooth transition from an operative engagement of a valve 373 or 374 with one of the cam profiles 390A and 390B to the other.

Figure 8:
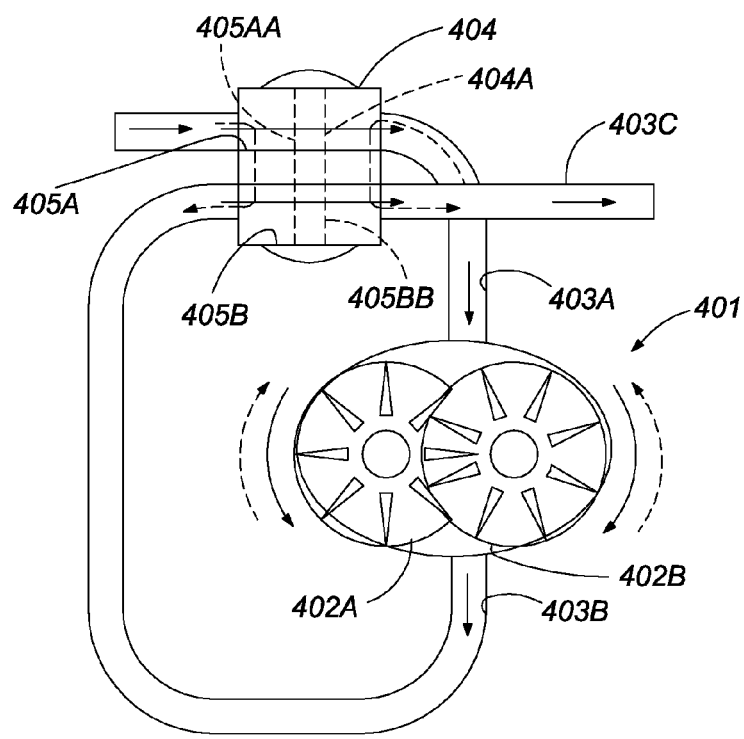
FIG. 8 is a schematic illustration of an engine-driven pump and reversing valve optionally useable with the powertrain of FIG. 1.

Referring to FIG. 8, a crankshaft driven pump 401 is depicted, showing pump gears 402A, 402B rotating in a direction corresponding with rotation of an engine crankshaft in a first direction of rotation that corresponds with a forward driving direction of the vehicle, as described above for any of the engines 12, 112, 212 312. A direction of input lubrication fluid flow from an oil sump pickup tube in an input channel 403A is depicted as well as the corresponding direction of output flow of pressurized lubrication fluid to engine bearings, and torque transmitting mechanisms through an exhaust channel 403B is depicted. A reversing valve 404 in fluid communication with the input channel 403A and the exhaust channel 403B is shown in a forward operation position, with first and second channel portions 405A and 405B aligned to allow fluid flow as depicted by the solid arrows.

If the engine is controlled such that the crankshaft rotates in an opposing direction corresponding with a reverse driving torque at the output member of an electrically variable transmission, as described with respect to any of the embodiments above, the pump gears 402A and 402B will rotate in an opposite direction (shown in phantom) due to rotation in a second direction of the crankshaft to which they are connected. Under these conditions, the reversing valve 404, which is preferably a rotary type solenoid-actuated reversing valve, is controlled by a controller (any of the controllers described in any of the embodiments above) to move to a reverse operation position, depicted as 404A in FIG. 8 in which channel portions 405A and 405B are indicated as 405AA and 405BB in their rotated positions. In the reverse operation position, the first and second channel portions are rotated ninety degrees clockwise such that fluid flow from the oil sump is directed through channel portion 405AA, to channel 403B to the crankshaft driven pump 401, in an opposing flow direction to that in forward operation, as illustrated by the dashed arrows. Thus, the channel 403B serves to provide intake flow to the pump 401 during reverse operation of the engine. Second channel portion 405BB of the reversing valve 404 is in a position to cause exhaust fluid flow from the pump 401 in channel 403A to route to the engine bearings and torque-transmitting mechanisms through supply channel 403C. Thus, the reversing valve 404 is controllable to move between forward operation and reverse operation positions to ensure that flow through the channel 403C to the engine is a predetermined amount (i.e., volume) and direction of fluid flow regardless of the direction of rotation of the pump 401 (and, therefore, regardless of the direction of rotation of the engine crankshaft connected to the pump).

Figure 9:
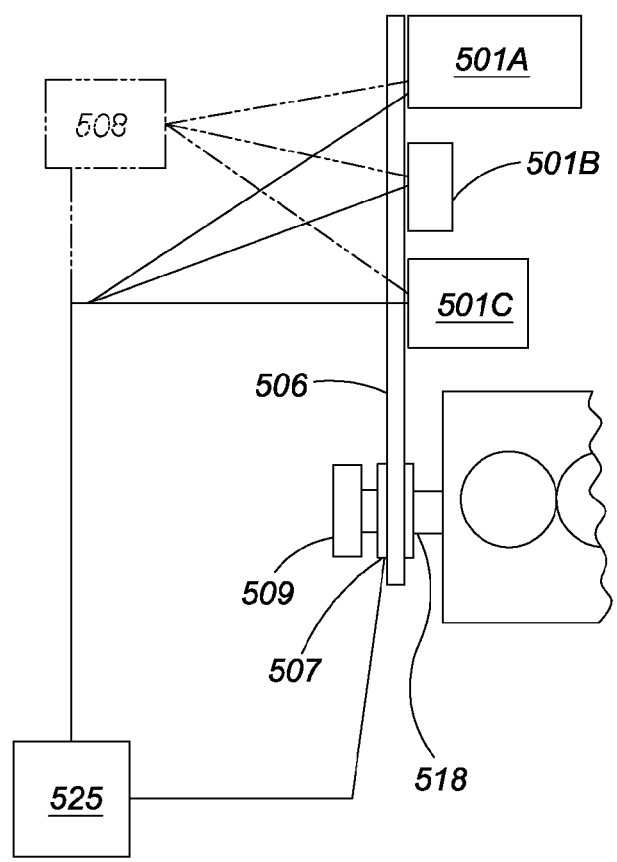
FIG. 9 is a belt or chain driven auxiliary drive with a reversing device.

Referring to FIG. 9, engine driven auxiliary or accessory devices 501A, 501B and 501C are shown operatively connected to an engine crankshaft 518 via an endless rotatable device 506, such as a belt or chain. The crankshaft 518 may be operatively connected to any of the engines 12, 112, 212, 312, described above such that the crankshaft 518 may rotate in first and second directions corresponding with forward and reverse drive at the output member 16 of the electrically variable transmission 14. It should be appreciated that the accessories 501A-C may also be driven off of the transmission input member 21 of FIG. 1. Preferably, the engine accessory 501A is a high pressure direct fuel injection pump, engine accessory 501B is an air conditioning compressor, and engine accessory 501C is a power steering pump. If the accessories 501A-C are not of the dual-drive type (i.e., are not configured to be driven by their own internal electric motor as an alternative to the crankshaft driven mode), a reversing device 507 operatively connected to a controller 525 may be actuated to reverse the direction of rotation of the belt 506 relative to the crankshaft 518 when the crankshaft 518 rotates in a second direction of rotation corresponding with reverse driving torque at the transmission output member 16. Alternatively, if the engine driven accessories 501A-501C are not of the dual-drive type, a separate accessory drive motor 508 may be controlled by the controller 525 to power the accessories 501A-501C when the crankshaft 518 rotates in the second direction, corresponding with the reverse driving torque of the output member and reversing device 507 in a neutral condition. An engine harmonic damper 509 may be utilized to absorb engine vibrations, preventing transmission of the vibrations to the accessories 501A-501C.

Figure 10:
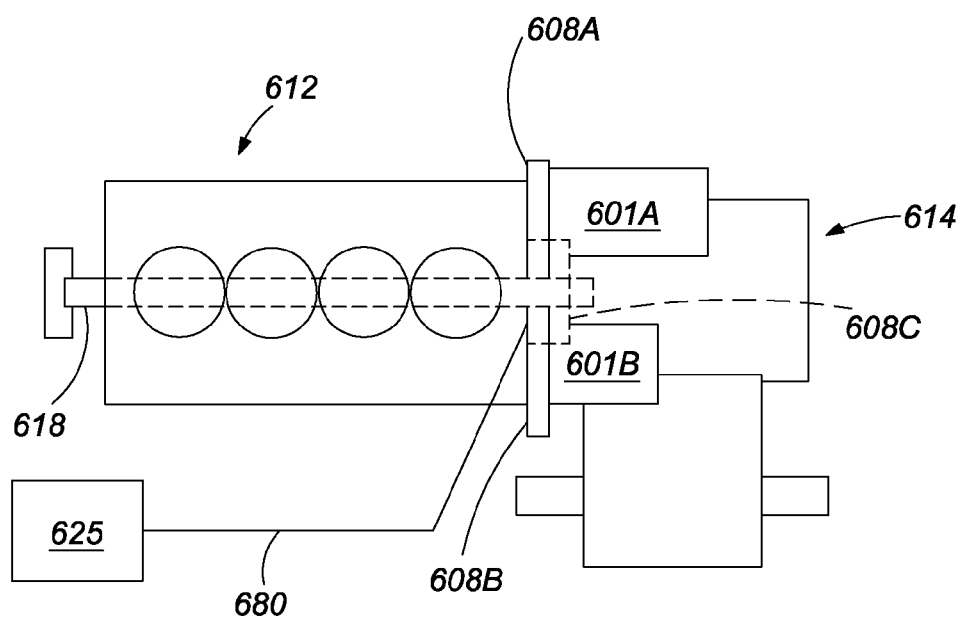
FIG. 10 is an illustration of an engine for use with the powertrain in FIG. 1 having a gear-driven accessory device with the reverse gear selectively engageable to run accessories when the engine crankshaft rotates in a reverse direction.

Referring to FIG. 10, a crankshaft 618 of an engine 612 drives accessories 601A, 601B. (The crankshaft 618 is visible only at one end of the engine 612 but extends to drive the accessories 601A, 601B via gears 608A, 608B, respectively driven by the crankshaft 618 to rotate commonly with the accessories 601A, 601B). When the crankshaft 618 rotates in a first direction, corresponding with rotation of an output member operatively connected to an EVT engine (not shown), the gears rotate in respective predetermined directions. However, when the crankshaft 618 is controlled to rotate in a second direction, corresponding with a reverse driving torque at an output member of the attached EVT transmission 614, a reverse gear 608C is actuated via a control signal 680 sent from a controller 625 to engage with the gears 608A and 608B such that they continue to rotate in the predetermined direction in which they rotated when the crankshaft rotated in the first direction, such that the change in direction of the rotation of the crankshaft 618 will not affect the driving rotation of the accessories 601A and 601B.

Accordingly, each of the embodiments described above are controllable such that an engine crankshaft rotates in two directions, allowing a transmission output member of an attached electrically variable transmission to rotate in both a forward driving torque direction and a reverse driving torque direction, while allowing power flow paths through the electrically variable transmission to remain identical in forward and reverse operation, and without requiring a reverse gear or the use of either of the motor/generators to control the output member to rotate in a reverse direction.

A method of controlling a powertrain is accomplished by any of the engines described above when attached to an electrically variable transmission. The method will be specifically described with respect to the powertrain 10 of FIG. 1 with engine 12 as specifically shown in FIG. 3. The method includes receiving a request for rotation of the output member 16 in one of the forward direction and a reverse direction. The request is received via the input request signal 79 to the controller 25. The method then includes lifting the intake and exhaust valves 73, 74, respectively, according to a first predetermined phasing with respect to rotation of the crankshaft 18, thereby causing the crankshaft 18 to rotate in a first direction that corresponds with rotation of the transmission output member 16 in the forward direction, assuming the received input request signal 79 for rotation of the output member 16 is in the forward direction. Alternatively, assuming that the received input request signal 79 is for rotation of the output member 16 in the reverse driving direction, the method includes lifting the intake and exhaust valves 73, 74, respectively, according to a second predetermined phasing with respect to rotation of the crankshaft 18. The second predetermined phasing substantially opposes the first predetermined phasing (as shown if FIG. 4A, 4B), and causes the crankshaft 18 to rotate in a second direction that corresponds with rotation of the output member 16 in the reverse direction. Power flow paths through the transmission 14 are the same whether the valves are lifted according to the first predetermined phasing or the second predetermined phasing. That is, the modes of operation shown in FIG. 2 are utilized to provide both forward driving torque or reverse driving torque.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
an engine having a crankshaft rotatable in a first direction and in a second direction;
a controller configured to control the direction of rotation of the crankshaft;
an electrically variable transmission having an input member operatively connected with the crankshaft and an output member for providing driving torque;
wherein the output member rotates in a forward direction when the crankshaft rotates in the first direction and rotates in a reverse direction when the crankshaft rotates in the second direction for providing forward and reverse torque, respectively;
a pump separate from the engine and operatively connected with the controller and drivingly connected with the crankshaft for providing a predetermined flow of fluid when the crankshaft rotates in the first direction;
an electrically-actuated reversing valve in fluid communication between the crankshaft and the pump and operatively connected to the controller; and
wherein the controller is configured to actuate the electrically-actuated reversing valve when the crankshaft rotates in the second direction, thereby maintaining the predetermined flow of fluid from the pump.

2. The powertrain of claim 1, wherein the electrically variable transmission is controllable by the controller to selectively provide a fixed ratio operating mode and an electrically variable operating mode; and wherein said modes may be selected when the crankshaft rotates in the first direction and when the crankshaft rotates in the second direction.

3. The powertrain of claim 1, wherein the transmission is characterized by an absence of a gear used exclusively to carry torque when the output member is rotating in the reverse direction.

4. The powertrain of claim 1, further comprising:
an accessory device operatively connected with the controller;
an endless rotatable device operatively connecting the crankshaft with the accessory device;
a motor operatively connected to the accessory device and to the controller; and
wherein the controller is configured such that the accessory device is driven by the engine through the endless rotatable device when the crankshaft rotates in the first direction and is driven by the motor when the crankshaft rotates in the second direction.

5. The powertrain of claim 1, wherein a powerflow path through the transmission is identical regardless of the direction of rotation of the crankshaft.

6. The powertrain of claim 1, wherein the electrically variable transmission is controllable by the controller to selectively provide four fixed ratio operating modes and two electrically variable operating modes; and wherein said modes may be selected when the crankshaft rotates in the first direction and when the crankshaft rotates in the second direction.

7. A powertrain comprising:
an engine having a crankshaft rotatable in a first direction and in a second direction;
a controller configured to control the direction of rotation of the crankshaft;
an electrically variable transmission having an input member operatively connected with the crankshaft and an output member for providing driving torque;
wherein the output member rotates in a forward direction when the crankshaft rotates in the first direction and rotates in a reverse direction when the crankshaft rotates in the second direction for providing forward and reverse torque, respectively;
an auxiliary drive train operatively connected to and driven by the crankshaft both when the crankshaft rotates in the first direction of rotation and when the crankshaft rotates in the second direction of rotation; wherein the auxiliary drive train is characterized by rotation in a predetermined direction when the crankshaft rotates in the first direction; and
a rotating member operatively connected to the controller and selectively engagable with the auxiliary drive train via the controller when the crankshaft rotates in the second direction to change a direction of rotation of the auxiliary drive train to the predetermined direction.

8. The powertrain of claim 7, wherein the electrically variable transmission is controllable by the controller to selectively provide four fixed ratio operating modes and two electrically variable operating modes; and wherein said modes may be selected when the crankshaft rotates in the first direction and when the crankshaft rotates in the second direction.

9. The powertrain of claim 7, wherein the electrically variable transmission is controllable by the controller to selectively provide a fixed ratio operating mode and an electrically variable operating mode; and wherein said modes may be selected when the crankshaft rotates in the first direction and when the crankshaft rotates in the second direction.

10. The powertrain of claim 7, wherein the transmission is characterized by an absence of a gear used exclusively to carry torque when the output member is rotating in the reverse direction.

11. The powertrain of claim 7, wherein a powerflow path through the transmission is identical regardless of the direction of rotation of the crankshaft.

* * * * *